US008967840B1

(12) United States Patent  
Haney

(10) Patent No.: US 8,967,840 B1
(45) Date of Patent: Mar. 3, 2015

(54) VEHICLE AUXILIARY LIGHTING SYSTEM

(76) Inventor: Curtis J. Haney, Reseda, CA (US)

( * ) Notice: Subject to any disclaimer, the term of this patent is extended or adjusted under 35 U.S.C. 154(b) by 888 days.

(21) Appl. No.: 12/927,885

(22) Filed: Nov. 29, 2010

Related U.S. Application Data

(60) Provisional application No. 61/283,301, filed on Dec. 2, 2009.

(51) Int. Cl.
B60Q 1/12 (2006.01)
B60Q 1/56 (2006.01)

(52) U.S. Cl.
USPC ........... 362/500; 362/545; 362/464; 362/498; 362/499; 362/36; 340/472

(58) Field of Classification Search
USPC ........... 362/543, 544, 545, 36, 459, 464, 465, 362/466, 467, 475, 473, 476, 478, 487, 499, 362/500, 507, 523, 524, 525, 538, 540, 541, 362/542, 183, 184, 185, 227, 236, 272, 310, 362/548, 549; 340/472, 475, 479
See application file for complete search history.

(56) References Cited

U.S. PATENT DOCUMENTS

| 3,940,657 A | 2/1976 | Kasiewicz et al. | |
| 4,310,872 A | 1/1982 | Lauve | |
| 4,381,537 A * | 4/1983 | Hinrichs | 362/500 |
| 4,430,692 A * | 2/1984 | Papadakis | 362/500 |
| 5,260,685 A | 11/1993 | Parker | |
| 5,530,630 A * | 6/1996 | Williams, Jr. | 362/500 |
| 5,838,247 A | 11/1998 | Bladowski | |
| 6,045,244 A * | 4/2000 | Dixon et al. | 362/500 |
| 6,220,733 B1 * | 4/2001 | Gordon | 362/500 |
| 6,380,865 B1 | 4/2002 | Pederson | |
| 6,469,443 B1 | 10/2002 | Bryant et al. | |
| 6,565,243 B1 * | 5/2003 | Cheung | 362/500 |
| 6,614,359 B2 | 9/2003 | Pederson | |
| 6,789,928 B2 * | 9/2004 | Khan | 362/500 |
| 6,989,743 B2 | 1/2006 | Pederson | |
| 2008/0101053 A1 * | 5/2008 | Hoffman et al. | 362/35 |

* cited by examiner

Primary Examiner — Stephen F Husar
Assistant Examiner — Danielle Allen
(74) Attorney, Agent, or Firm — Albert O. Cota

(57) ABSTRACT

A vehicle auxiliary lighting system (VALS 10) having attached to the side of a vehicle a set of side lights that automatically illuminate in synchrony with a corresponding set of vehicle lights are activated by a vehicle driver. The side lights are attached to four moisture-resistant enclosures namely: a left front light enclosure (12), a right front light enclosure (28), a left rear light enclosure (38) and a right rear light enclosure (54). The enclosures, which are attached to a structure adjacent a set of disk brakes and a set of drum brakes, are viewed through openings on a set of spoked vehicle wheels. The side lights, which correspond to the vehicle's front facing lights, produce an amber light; the side lights that correspond to the vehicle's rear facing lights produce a red light; and the side light that corresponds to a vehicle's reverse light produces a white light. By utilizing the VALS (10) the margin of safety for both pedestrians and other motorists is increased.

15 Claims, 5 Drawing Sheets

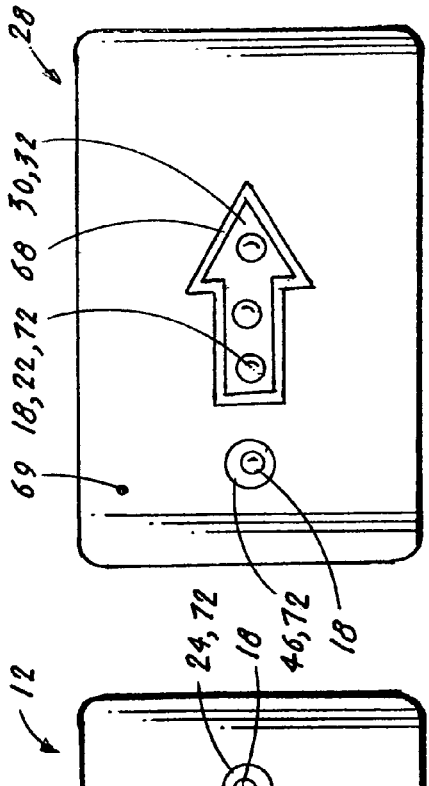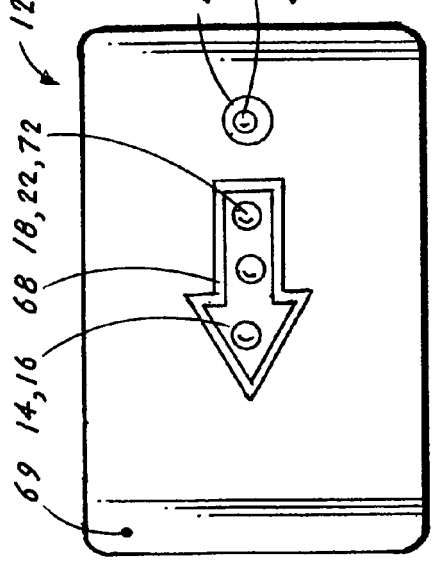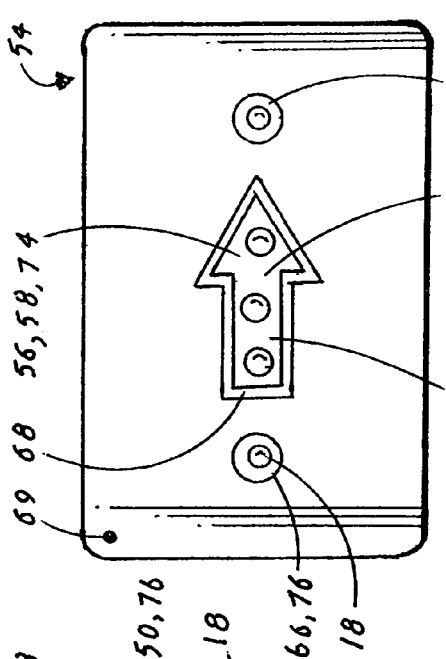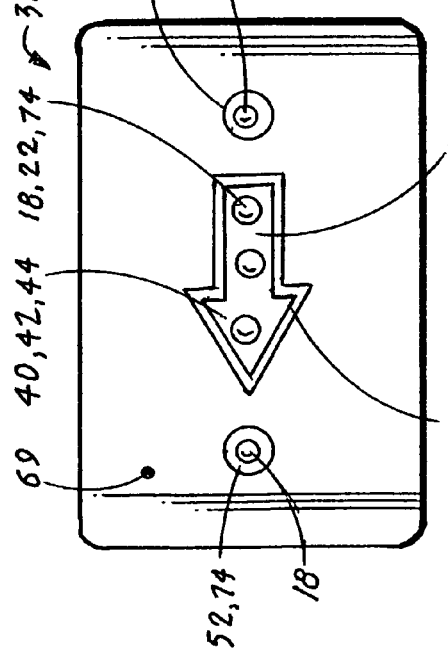

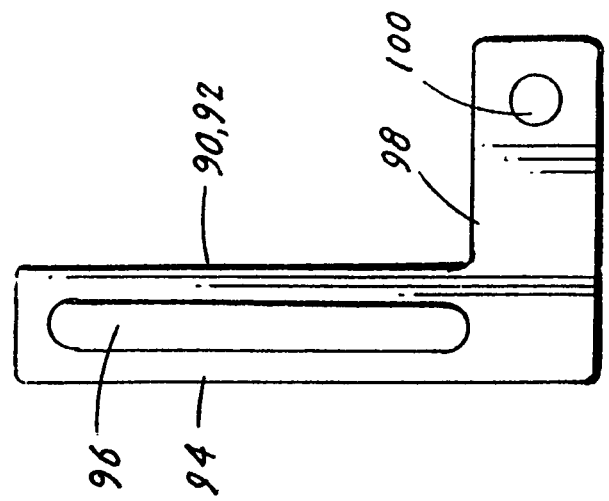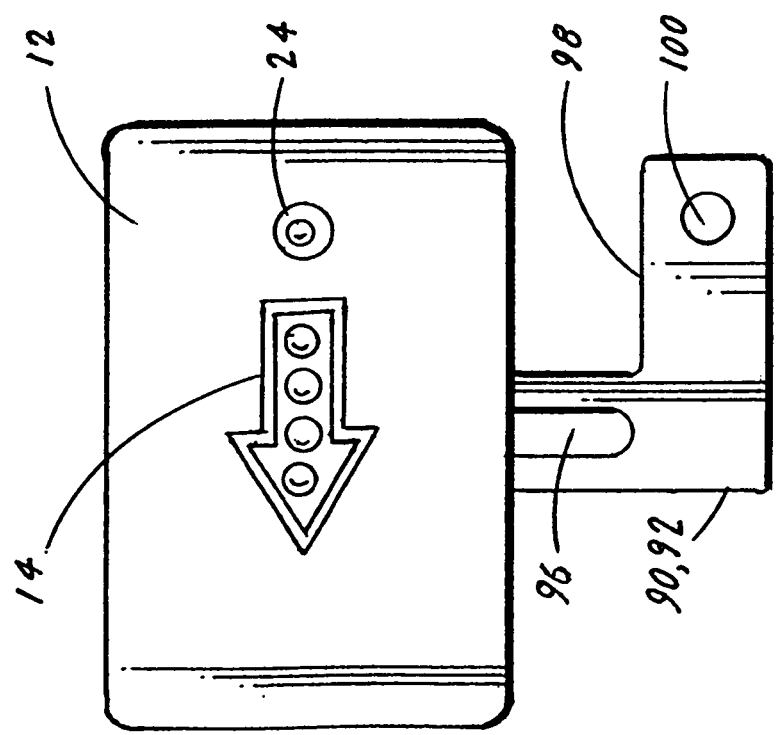

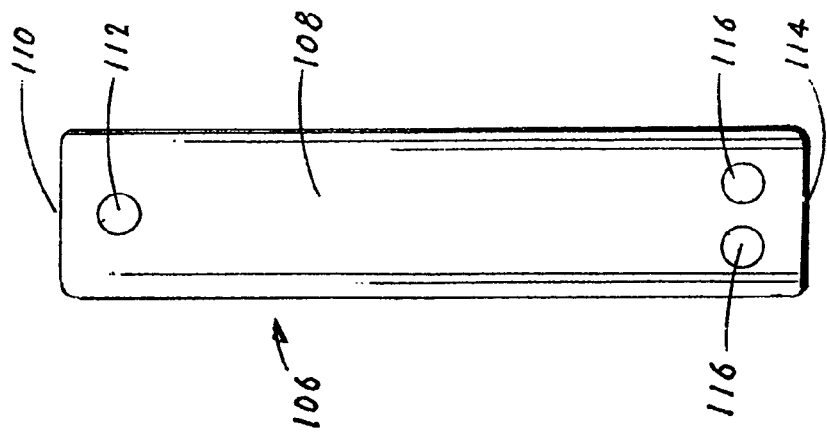
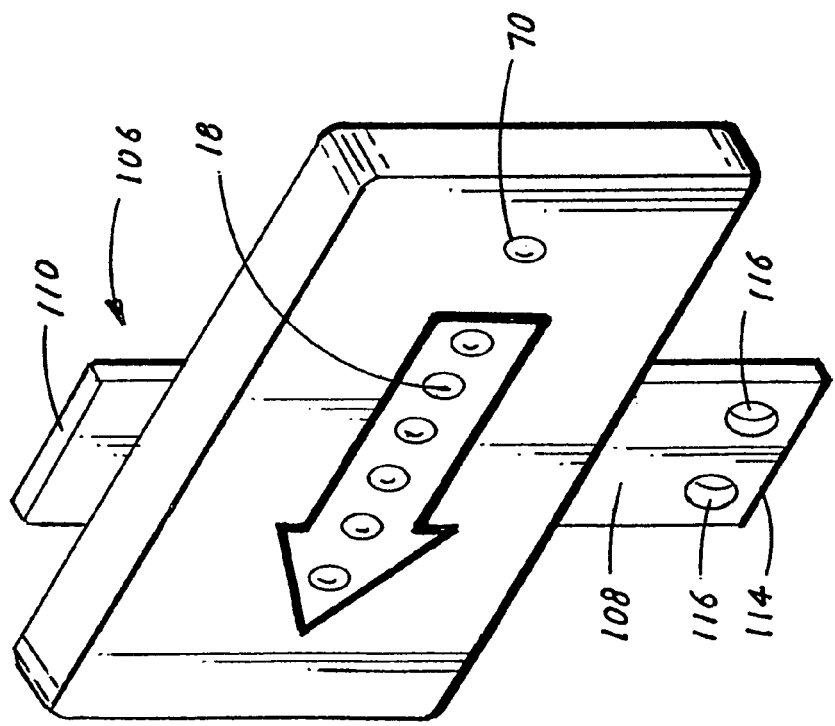

VEHICLE AUXILIARY LIGHTING SYSTEM

This application claims priority of Provisional Patent Application No. 61/283,301 filed Dec. 2, 2009.

TECHNICAL FIELD

The invention generally pertains to vehicle lighting systems, and more particularly to a vehicle auxiliary lighting system (VALS) having a set of a light enclosures that are attached to a vehicle's front and rear brakes and that are visible through side openings in the vehicle's wheel.

BACKGROUND ART

The most widely used and popular means of transportation throughout the world is a motorized vehicle, such as a personal automobile or a public transportation vehicle. One of the most important considerations when designing and operating any motorized vehicle is safety. Typically, most vehicles are operated in close proximity to people and other vehicles which present a one-sided danger to a person in the event of an accident that involves a vehicle hitting a person.

As a result, vehicle designers and manufacturers have allocated significant resources to providing the most effective safety methods possible. One of the oldest and ubiquitous methods is to provide a system of lights on a vehicle that visually indicate what the vehicle is doing or about to do. These lights include but are not limited to brake lights, left and right turn indicator lights, and reverse direction lights. In an effort to constantly improve the safety characteristics of a vehicle, designers and manufacturers attempt to discover where there are light deficiencies.

One such deficiency is the absence of lights on the right or left sides of a vehicle. Conventional front and rear lights provide adequate safety considerations when viewing a vehicle from the front or rear, but it is difficult to see the lights when viewing the vehicle from either side. This is a significant problem in that vehicles and people travel in many directions simultaneously, and there is constant interaction between people approaching vehicles from the front, rear or sides.

Obviously, what is needed is a visual indication means such as a light that can be viewed from the sides of to a vehicle. Lights that are viewed from the side would provide an effective means of indicating to pedestrians and other drivers what a vehicle is currently doing such as braking and therefore allow the pedestrian or other drivers to decide on a safe course of action.

A search of the prior art did not disclose literature or patents that read directly on the claims of the instant invention. However, the following U.S. patents are considered related.

| PAT. NO. | INVENTOR | ISSUED |
| --- | --- | --- |
| 5,838,247 | Bladowski | 17 Nov. 1998 |
| 5,260,685 | Parker | 9 Nov. 1993 |
| 4,310,872 | Lauve | 12 Jan. 1982 |

The U.S. Pat. No. 5,838,247 disclose a lamp comprising an array of light emitting diodes (LEDs). The LEDs are mounted in substantial coincidence with the shape of the lamp reflector, to provide an area of light source concentration larger than the projected area of the lamp.

The U.S. Pat. No. 5,260,685 discloses a vehicle turn signal mechanism that includes a lockout turn device in the form of an electric timer. The signal is canceled by a steering wheel sensor that generates a triggering signal for an electromagnetic detent associated with a signal selector lever. The lockout device prevents the triggering signal from being generated except after the steering wheel is retained in a straight-ahead position for a predetermined time period.

The U.S. Pat. No. 4,310,872 discloses a unitized automotive front end that includes the bumper and headlights. The latter are mounted behind a translucent, aerodynamically-shaped, bullet-like airfoil having hinged panels which pivot downward to expose the headlights.

For background purposes and as indicative of the art to which the invention relates, reference may be made to the following remaining patents found in the search:

| PAT. NO. | INVENTOR | ISSUED |
| --- | --- | --- |
| 6,989,743 | Pederson | 24 Jan. 2006 |
| 6,614,359 | Pederson | 2 Sep. 2003 |
| 6,469,443 | Bryant et al | 22 Oct. 2002 |
| 6,380,865 | Pederson | 30 Apr. 2002 |
| 3,940,657 | Kasiewicz et al | 24 Feb. 1976 |

DISCLOSURE OF THE INVENTION

The vehicle auxiliary lighting system (VALS), also known as the Rim Turn and Brake Signal Indicator™, is designed to operate in combination with a vehicle that includes: a battery, a set of spoked wheels, left and right front brakes, a left and right rear brakes, an ignition switch and a set of lights that include: head lights, running lights and hazard lights.

The VALS is comprised of a left front light enclosure, a right front light enclosure, a left rear light enclosure and a right rear light enclosure. Each enclosure is:
  a) electrically connected in parallel with a corresponding vehicle light circuit,
  b) attached by a bracket to a stationary vehicle structure that is located within a respective vehicle wheel well, and
  c) positioned to allow a side light that is produced by each light enclosure to be viewed through spoked openings on the vehicle wheel, wherein when a vehicle driver activates a vehicle light, the corresponding light enclosure automatically illuminates in synchrony with the vehicle light to provide a side light that adds an additional margin of safety to both pedestrians and other motorists.

In view of the above disclosure, the primary object of the invention is to produce a vehicle auxiliary lighting system (VALS) that adds a set of colored side lights to a vehicle. The side lights automatically illuminate in synchrony with a corresponding vehicle light. The side lights provide an increased margin of safety to both pedestrians and other motorists.

In addition to the primary object of the invention it is also an object of the invention to produce a VALS that:
  provides additional side lights to alert pedestrians and other drivers that a vehicle is about to change directions, stop or move in reverse,
  connected in parallel and functions in synchrony with existing vehicle lights,
  can be easily installed by a qualified person,
  is accessible for maintenance when required, and
  is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a front elevational view of a left front light enclosure.

FIG. 4 is a front elevational view of a right front light enclosure.

FIG. 5 is a front elevational view of a left rear light enclosure.

FIG. 6 is a front elevational view of a right rear light enclosure.

FIG. 8 is a front elevational view of a typical L-shaped bracket that is used to attach a VALS light enclosure to the dust plate of a disk brake.

FIG. 9 is a front elevational view of the L-shaped bracket removed from the enclosure.

FIG. 10 is an orthographic front view of a typical straight bracket that is used to attach a VALS light enclosure to the back plate of a drum brake. This figure also shows a typical snap-on fastener inserted into the light enclosure.

FIG. 11 is an elevational front view of the typical straight bracket removed from the enclosure.

BEST MODE FOR CARRYING OUT THE INVENTION

Figure 1:
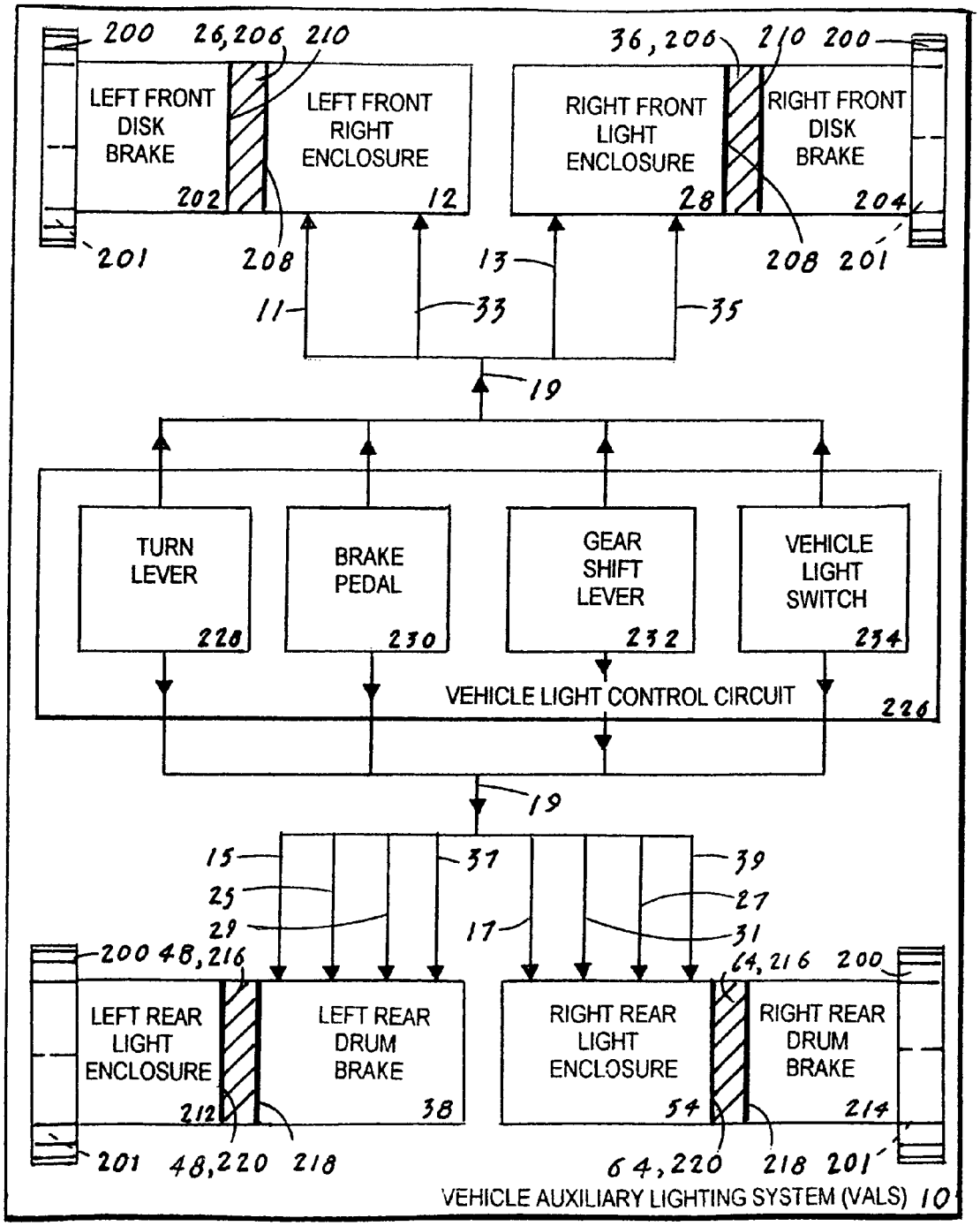
FIG. 1 is a block and signal flow diagram of the vehicle auxiliary lighting system (VALS).

The best mode for carrying out the invention is presented in terms that disclose a preferred embodiment of a vehicle auxiliary lighting system 10 (VALS 10). The VALS 10 includes a set of left and right side lights that when illuminated provide an additional margin of safety to both pedestrians and other motorists.

The preferred embodiment, as shown in FIGS. 1-11, is designed to operate in combination with existing vehicle elements that include for purposes of this disclosure: a tire 200 that is mounted to a vehicle wheel 201, a left front disk brake 202, a right front disk brake 204, a left rear drum brake 212, a right rear drum brake 214, a vehicle battery 224 and a vehicle light control circuit 226. The VALS 10 can be designed to function with either a pair of front disk brakes and a pair of rear disk brakes, with a pair of front disk brakes and a pair of rear drum brakes, or with a pair of front drum brakes and a pair of rear drum brakes. For purposes of brevity this invention disclosure is limited to a pair of front disk brakes and a pair of rear drum brakes.

Each of the disk brakes typically includes a stationary dust plate 206 having an inner surface 208 and an outer surface 210, and each of the drum brakes typically includes a stationary back plate 216 having an inner surface 218 and an outer surface 220.

Figure 7:
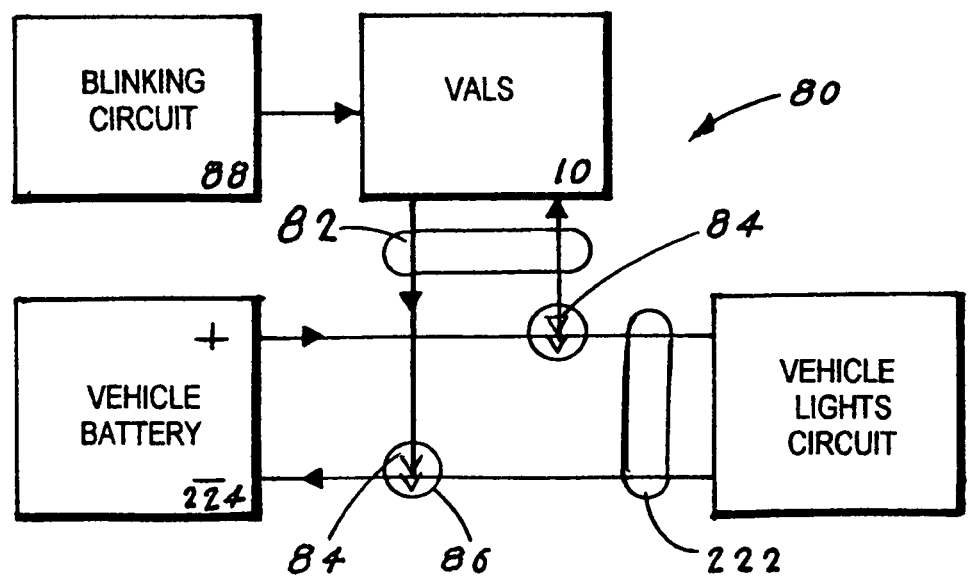
FIG. 7 is a block diagram of a VALS cable that is spliced into a vehicle cable that is attached between a vehicle battery and one of the vehicle's light circuits.

The vehicle light control circuit 226, as shown in FIG. 1, controls the application of a VALS activation signal 19 that is produced by a vehicle turn lever 228; a brake pedal 230; a gear shift lever 232; a vehicle light switch 234, and a hazard light switch 236 (not shown). The vehicle turn lever 228 is selectively positioned to produce a VALS activation signal 19 that translates, as shown in FIG. 1, into either to a left front turn signal 11, a left rear turn signal 15 or a right front turn signal 13 and a right rear turn signal 17. When the vehicle brake pedal 230 is depressed a left rear brake signal 25 and a right rear brake signal 27 are produce. The vehicle gear shift lever 232 when placed in reverse, produces a left rear reverse signal 29 and a right rear reverse signal 31 that are connected to a blinking circuit 88, as shown in FIG. 7. The vehicle light switch 234 produces a left front running light signal 33, a right front running light signal 35, a left rear running light signal 37 and a right rear running light signal 39. The signals 11,13,15 and 17 also respond when the vehicle's hazard lights are activated.

The primary elements that comprise the VALS 10, as shown in FIGS. 3-6, are a left front light enclosure 12, a right front light enclosure 28, a left rear light enclosure 38 and a right rear light enclosure 54.

The left front light enclosure 12, as shown in FIG. 3, includes a left turn indicator 14 that is displayed as a printed left arrow 16 having a plurality of LEDS 18 that blink when the left front turn signal 11 is applied. The LEDS are connected in a series-parallel configuration on an LED strip 22 and produce an amber light 72. At the tail end of the left arrow 16 is located a left front running light 24 that is comprised of a single LED 18, which also produces an amber light 72. The LED 18 on the light 24 is activated when the vehicle's front running lights are illuminated by the left front running light signal 33.

The right front light enclosure 28, as shown in FIG. 4, includes a right turn indicator 30 that is displayed as a printed right arrow 32 having a plurality of LEDS 18 that blink when the right front turn signal 13 is applied. The right arrow 32 has attached a plurality of series-parallel connected LEDs 18 that are configured in an LED strip 22 which produces an amber light 72. At the tail end of the right arrow 32 is located a right front running light 46 that is comprised of a single LED 18 which produces an amber light 72. The LED 18 is activated when the vehicle's right front running light is activated by the application of the right front running light signal 35.

The left rear light enclosure 38, as shown in FIG. 5, includes a brake indicator 60 and a left turn indicator 40, that are both displayed as a printed left arrow 42. The left arrow 42 has attached a plurality of series-parallel connected LEDs 18 that are configured in an LED strip 22 and which produce a red light 74. The LEDs 18 remain "on" when the left rear brake signal 25 is applied and blink when the left rear turn signal 15 is applied. At the tail end of the left arrow 42 is located a left reverse indicator 50 that consists of a single LED 18. The indicator 50 produces a white light 76 signifying that the vehicle's left reverse indicator has illuminated. The left reverse indicator 50 can also be designed to include a blinking circuit 88, as shown in FIG. 7. At the tail end of the left arrow 42 is located a left rear running light 52 that is comprised of a single LED 18. The light 52 produces a red light 74 that is activated when the left rear running light signal 37 is applied signifying that the vehicle's left rear running light has illuminated.

The right rear light enclosure 54, as shown in FIG. 6, includes a brake indicator 60 and a right rear turn indicator 56 that are both displayed as a printed right arrow 58. The right arrow 58 has attached a plurality of series-parallel connected LEDs 18 that are configured in an LED strip 22 which produces a red light 74. The LEDS 18 remain "on" when the right rear brake signal 27 is applied and blink when the right rear turn signal 17 is applied. At the tail end of the right arrow 58 is located a right reverse indicator 66 that consists of a single LED 18. The indicator 66 produces a white light 76 signifying that the vehicle's right reverse indicator has illuminated. The right reverse indicator 66 can also be attached to a blinking circuit 88, as shown in FIG. 7. At the tail end of the right arrow 58 is located a right rear running light 62 that is comprised of a signal LED 18. The light 62 produces a red light 74 and that is activated when the right rear running light signal 39 is applied signifying that vehicle's right rear running light has illuminated.

Preferably, the arrows have an outer edge that is embellished by the application of a chrome strip 68, as shown in FIGS. 3-6. Additionally, the area 69 surrounding the arrow can have a color that compliments the color of the vehicle. The light indicators that are located outside the boundary of the arrow utilize a single LED 18 that is located within a moisture-resistant snap-on enclosure 70, as shown in FIG. 8.

Figure 2:
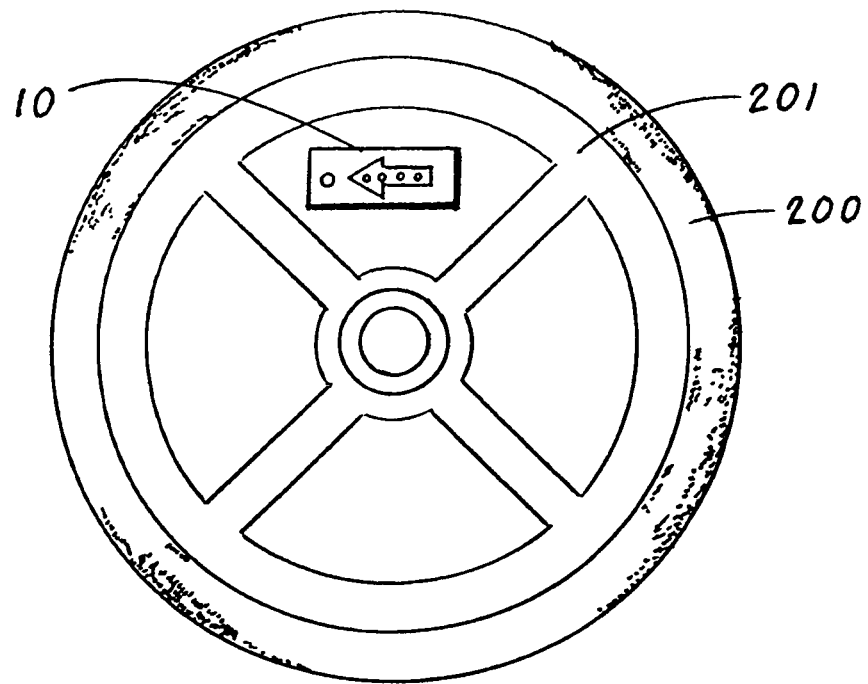
FIG. 2 is a front elevational view of a typical spoked vehicle wheel having a VALS that is viewed from an area between two of the spokes as the wheel and spokes rotate.

The overall VALS 10, as shown in the block and signal flow diagram of FIG. 1, is visibly attached to allow the light from each light enclosure to pass between the spokes of a rotating vehicle wheel 201, as shown in FIG. 2. All the light indicators located on the light enclosure are designed to illuminate in synchrony with the respective vehicle lights.

A typical VALS power application circuit 80, as shown in FIG. 7, comprises a VALS cable 82 that is attached by means of a splice 84 into a vehicle cable 222 which is connected between the vehicle battery 224 and a vehicle element, wherein the power application circuit 80 produces the VALS activation signal 19. To prevent a short circuit each splice 84 is wrapped with a shrink wrap or waterproof covering 86. FIG. 7 also shows an optional blinking circuit 88 that is typically connected to the reverse indicators.

The means 26,36 for attaching the left front light enclosure 12 and the right front light enclosure 28 to the stationary dust plate 206 comprises a dust plate attachment bracket 90. The bracket 90 is shown attached to a light enclosure 12 in FIG. 8, and in detached from the enclosure 12 in FIG. 9. The bracket 90 is typically comprised of an L-shaped mounting bracket 92 that includes a vertical member 94 having an elongated vertical slot 96 that is used to adjustably attach the rear surface of a light enclosure 12,28 by use of the attachment means. From the lower edge of the vertical member 94 extends a horizontal member 98 having at least one bore 100 that is attached by an attachment means to a respective stationary dust plate 206.

The means 48,64 for attaching the left rear light enclosure 38 and the right rear light enclosure 54 to the stationary back plate 216 comprises a back plate attachment bracket 106. The bracket 106 is typically comprised of a vertical structure 108 with an upper edge 110 having a single mounting bore 112, and a lower edge 114 having a pair of mounting bores 116. The bracket 106 is shown attached to a light enclosure in FIG. 10, and detached from the structure in FIG. 11. The brackets 90,106 are typical, as other bracket designs can also be utilized to attach the light enclosure to their respective vehicle structures.

While the invention has been described in detail and pictorially shown in the accompanying drawing it is not to be limited to such details since many changes and modifications may be made to the invention without departing from the spirit and the scope thereof. For example, incandescent lights can be used instead of LED lights and rather than using colored LEDs 18, all the LEDs can be white. To add color to the white LEDs, a translucent colored strip can be inserted into an enclosure slot that is positioned over the white LEDs. Also, the VALS cable 82 can include a fuse to provide additional high-current protection. Additionally the running lights can be activated and remains on until deactivated and the vehicle's turn signals can also be activated to directly display both the running lights and tuna signals. Hence, the VALS 10 is described to cover any and all modifications and forms which may come within the language and scope of the claims.

The invention claimed is:

1. A vehicle auxiliary lighting system (VALS) that operates in combination with a vehicle having a battery, a set of tires mounted onto a set of spoked vehicle wheels, a left front disk brake and a right front disk brake, wherein each disk brake includes a stationary dust plate having an inner surface and an outer surface, a left rear drum brake and a right rear drum brake, wherein each drum brake includes a stationary back plate having an inner surface and an outer surface, and a vehicle light control circuit that produces a VALS activation signal that is dependent upon the operation of a vehicle turn which is selectively positioned to produce either a left front turn signal and a left rear turn signal or a right front turn signal and a right rear turn signal, a vehicle brake pedal that when depressed produces a left rear brake signal and a right rear brake signal, a vehicle gear shift lever that when placed in reverse produces a left rear reverse signal and a right rear reverse signal, and vehicle light switches that when activated selectively illuminates the vehicle running lights and hazard lights, wherein said VALS comprises a set of stationary light enclosures that are each attached by an attachment means to the inner surface of a stationary dust plate, wherein each said light enclosure remains in a stationary position while each vehicle wheel rotates allowing the light from said light enclosure to pass through the rotating wheel spokes, wherein said set of stationary light enclosures are comprised of:
   a) a left front light enclosure attached to the inner surface of the left front stationary dust plate, said enclosure having a left turn indicator, a left front running light indicator and a left front hazard light indicator,
   b) a right front light enclosure attached to the inner surface of the right front stationary dust plate, said enclosure having a right turn indicator, a right front running light indicator and a right front hazard light indicator,
   c) a left rear light enclosure attached to the inner surface of the stationary left rear back plate, said enclosure having a left turn indicator, a reverse indicator, a left rear running light indicator, a left rear hazard light indicator and a left rear brake indicator, and
   d) a right rear light enclosure attached to the inner surface of the stationary right rear back plate, said enclosure having a right turn indicator, a brake indicator, a reverse indicator, a hazard light indicator and a right rear running light indicator, wherein when the VALS activation signal is applied from the vehicle light control circuit, the respective indicator on the respective light enclosure illuminates in synchrony with the corresponding vehicle light, wherein said VALS provide side viewing lights that add an additional margin of safety to both pedestrians and other motorists.

2. The VALS as specified in claim 1 wherein, said VALS can be designed to function with a pair of front disk brakes and pair of rear disk brakes, a pair of front disk brakes and a pair of rear drum brakes, or a pair of front drum brakes and a pair of rear drum brakes.

3. The VALS as specified in claim 1 wherein said light enclosure is moisture resistant.

4. The VALS as specified in claim 1 wherein said means for attaching said left front light enclosure and said right front light enclosure to the stationary dust plate comprises a bracket.

5. The VALS as specified in claim 4 wherein said dust plate attachment bracket comprises an L-shaped mounting bracket having:
   a) a vertical member having an elongated vertical slot that is adjustably attached by an attachment means to the rear surface of a respective said light enclosure, and
   b) a horizontal member that integrally extends from the lower edge of the vertical member and having at least one bore that is used to attach the horizontal member to the respective dust plate.

6. The VALS as specified in claim 1 wherein said means for attaching said left rear light enclosure and said right rear light enclosure to the stationary back plate comprises a bracket.

7. The VALS as specified in claim 1 wherein said back plate attachment bracket comprises a vertical structure with an upper edge having a single mounting bore and a lower edge having a pair of mounting bores that are used to attach the bracket to the respective back plate.

8. The VALS as specified in claim 1 wherein the left and right turn indicators include an arrow having an outer edge that is embellished by the application of a chrome strip, wherein the area surrounding the arrow has a color that compliments the color of the vehicle.

9. The VALS as specified in claim 1 wherein said left turn and said right turn light indicators are comprised of a plurality of light emitting diodes (LEDs) that are attached to an (LED) light emitting diode strip located inside the boundary of an arrow, and are connected in a series-parallel configuration and blink in concert with the vehicle's blinking left turn and right turn blinking signals and remain "on" when a brake signal is produced from both the rear wheels of the vehicle or blink if a right or left turn signals has been selected.

10. The VALS as specified in claim 9 wherein said light indicators that are located outside the boundary of the arrow utilize a single light emitting diode (LED) that is located within a moisture resistant enclosure which functions with the vehicle's running light activation circuit or the reverse light activation circuit.

11. The VALS as specified in claim 1 wherein said light enclosures further comprise light emitting diodes (LEDs) attached to said left front light enclosure and said right front light enclosure produce an amber light.

12. The VALS as specified in claim 1 wherein said light enclosures further comprise light emitting diodes (LEDs) attached to said rear left and rear right turn blinking indicators, and to said brake indicators produce a red light.

13. The VALS as specified in claim 1 wherein the reverse signals said light enclosures further comprise light emitting diodes (LEDs) located on said left rear and said right rear light enclosures produce a white light and are connected to a blinking circuit.

14. The VALS as specified in claim 1 wherein each of the signals employing light emitting diode indicators on said light enclosures are connected to a power application circuit comprising a VALS cable that is attached in parallel by means of a splice into a vehicle cable which is connected between the vehicle battery and a vehicle light circuit.

15. The VALS as specified in claim 14 wherein each splice is wrapped with a waterproof covering.

* * * * *